J. A. THOMPSON.
HYGROMETER.
APPLICATION FILED OCT. 27, 1909.
998,049.
Patented July 18, 1911.
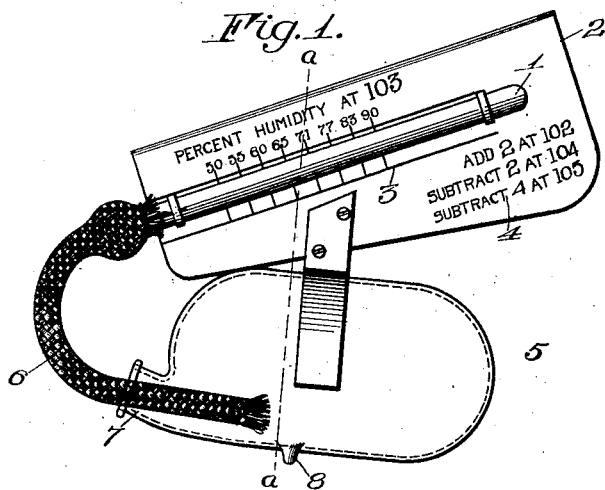
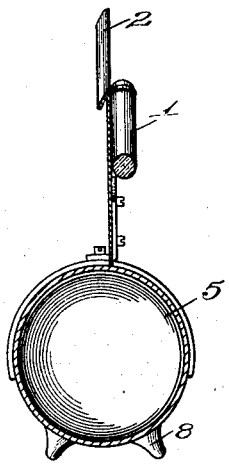

ically constant temperature without any material calculations.

UNITED STATES PATENT OFFICE.

JOHN A. THOMPSON, OF ROCHESTER, NEW YORK, ASSIGNOR TO TAYLOR INSTRUMENT COMPANIES, OF ROCHESTER, NEW YORK, A CORPORATION OF NEW YORK.

HYGROMETER.

998,049. Specification of Letters Patent. Patented July 18, 1911.

Application filed October 27, 1909. Serial No. 524,907.

*To all whom it may concern:*

Be it known that I, JOHN A. THOMPSON, of Rochester, in the county of Monroe and State of New York, have invented certain new and useful Improvements in Hygrometers; and I do hereby declare the following to be a full, clear, and exact description of the same, reference being had to the accompanying drawings, forming a part of this specification, and to the reference-numerals marked thereon.

The present invention relates to hygrometers of the "wet bulb" type and it has for an object to make provision whereby greater accuracy is secured in the readings of the instrument.

Another object is to provide a simple and inexpensive connection between the reservoir and the thermometer which enables the reservoir to be made of glass so that the level of the liquid in the reservoir may be immediately ascertained.

Still another object is to provide an improved means for obtaining readings at a substantially constant temperature without any material calculations.

To these and other ends the invention consists in certain improvements and combinations of parts, all as will be hereinafter more fully described, the novel features being pointed out in the claims at the end of the specification.

In the drawings: Figure 1 is a front elevation of the hygrometer, and Fig. 2 is a section on line *a—a*, Fig. 1.

In the present embodiment the thermometer 1 is supported on a plate 2 which has a scale 3 extending along the stem. This scale has divisions indicating degrees of saturation of the air at a certain dry bulb temperature, say 103° Fahr. thus adapting the device for use in incubators or other places where the temperature is substantially constant. In order that other readings may be obtained from the scale at other and proximate dry bulb temperatures with but slight calculations instructions 4 are arranged on the plate 2.

Water is fed to the thermometer from a reservior 5 by means of a capillary member or wick 6 which may at one end surround the thermometer bulb. The reservoir is preferably transparent, being made of glass, in order that the level of the water may be ascertained. The wick in this instance connects with the reservoir at a point below the uppermost water level so that the immersed portion will be constant. This is very important as the wick always receives the same amount of water and the water supply does not decrease with the lowering of the water level. It is preferred to construct the reservoir with a small throat 7 at one end turned upwardly slightly, the water being held from discharge through the throat by making the reservoir air tight above the discharge. Feet 8 are arranged nearer to the throat end of the reservoir than to the opposite end so that the reservoir will lie at a slight inclination.

The thermometer is preferably supported on the reservoir and as the latter is made of glass a connecting means should be provided which will prevent injury to the reservoir. In this instance the plate 2 carries a clamp in the form of two spring arms curved to conform to the reservoir and adapted to embrace and interlock with the latter by coöperating with opposite sides of the same. This clasp performs the function of a saddle and permits the parts to be separated for renewal or for shipment.

In operation the hygrometer is placed within a chamber having a substantially constant temperature, the reservoir having been previously filled with water and the parts connected as shown in Fig. 1. The water will be carried by capillary action to the thermometer bulb and evaporate, the amount of evaporation being dependent on the moisture in the chamber. The evaporation on the bulb affects the latter and causes the thermometer to indicate the humidity, say at 103° Fahr. The humidity at other proximate temperatures may be obtained by following the instructions on the plate 2.

A hygrometer constructed in accordance with this invention gives more accurate readings as the immersed portion of the capillary member is constant. The level of the liquid in the reservoir may be ascertained without handling the device and the reservoir will last longer as it is not subject to leakage. If it becomes broken it may be easily replaced by another.

I claim as my invention:

1. In a hygrometer, the combination with a reservoir of transparent material, of a thermometer arranged exteriorly of the reservoir, a spring clamping member supporting the thermometer and adapted to engage opposite sides of the reservoir and a capillary member leading from the reservoir to the thermometer.

2. In a hygrometer, the combination with a reservoir, a supporting member and a thermometer carried by the latter, of a clasp secured to the supporting member embodying a pair of spring arms engaging the reservoir on opposite sides to support the bulb of the latter on the exterior of the reservior, and a capillary member leading from the reservoir to the bulb of the thermometer.

JOHN A. THOMPSON.

Witnesses:
H. H. SIMMS,
RUSSELL B. GRIFFITH.

Copies of this patent may be obtained for five cents each, by addressing the "Commissioner of Patents, Washington, D. C."